H. T. JOSE.
WIND SHIELD FOR MOTOR CYCLES.
APPLICATION FILED JAN. 16, 1917.
1,239,916.
Patented Sept. 11, 1917.
2 SHEETS—SHEET 1.
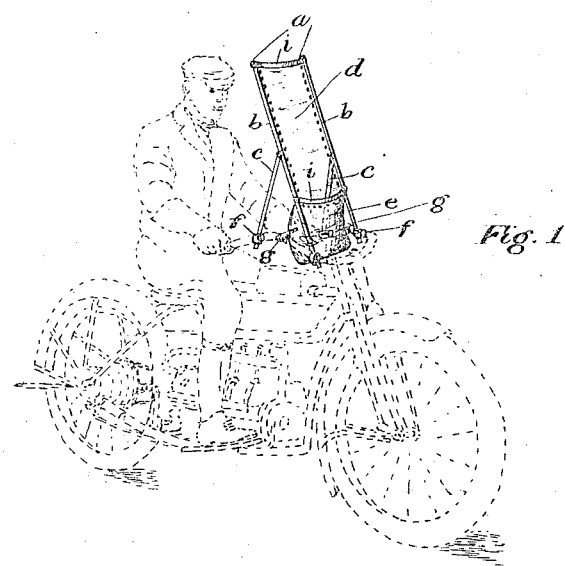
Fig. 1
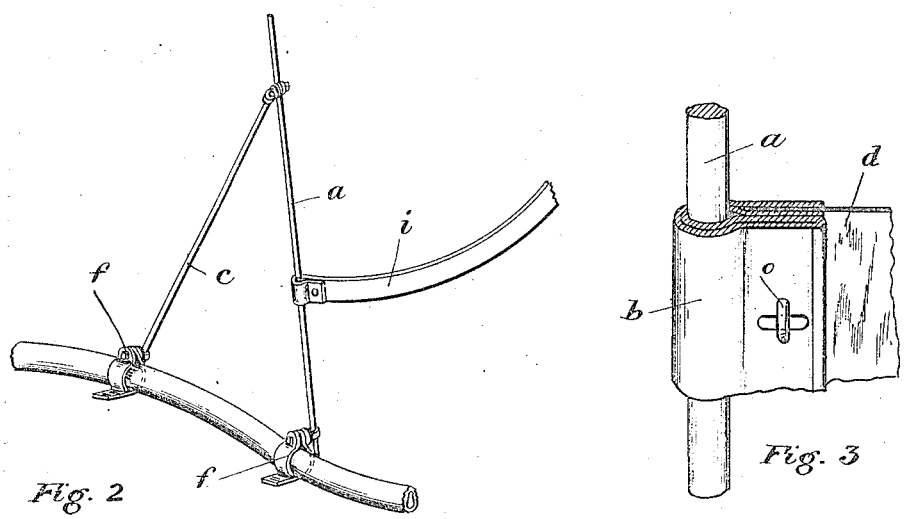
Fig. 2
Fig. 3
Inventor:
Harry T. Jose
by S. W. Bates
Atty

H. T. JOSE.
WIND SHIELD FOR MOTOR CYCLES.
APPLICATION FILED JAN. 16, 1917.

1,239,916.

Patented Sept. 11, 1917.
2 SHEETS—SHEET 2.

Inventor.
Harry T. Jose
by S. W. Bates
Atty.

UNITED STATES PATENT OFFICE.

HARRY T. JOSE, OF BIDDEFORD, MAINE.

WIND-SHIELD FOR MOTOR-CYCLES.

1,239,916.    Specification of Letters Patent.    Patented Sept. 11, 1917.

Application filed January 16, 1917.   Serial No. 142,728.

*To all whom it may concern:*

Be it known that I, HARRY T. JOSE, a citizen of the United States, residing at Biddeford, in the county of York and State of Maine, have invented certain new and useful Improvements in Wind-Shields for Motor-Cycles, of which the following is a specification.

My invention relates to a wind shield adapted for motor cycles and the object of the invention is to construct a wind shield which may readily be attached and removed from the handle bars of the machine, which may be cheaply made and simply constructed so that its cost will come within the reach of the average rider of motor cycles.

According to my invention, I make use of an upright frame which is located above and between the handle bars of the machine, the frame being formed with a curve or arch extending toward the front. Over the frame is stretched a piece of celluloid or other flexible transparent material and below the frame and extending downwardly and rearwardly is a deflecting apron which acts to deliver air directly onto the motor.

Figure 4:
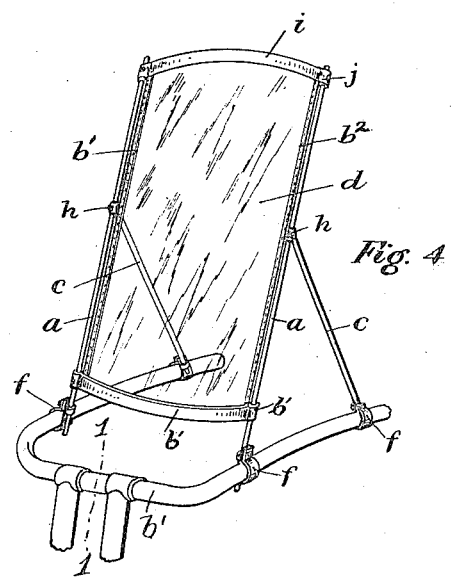
Figure 5:
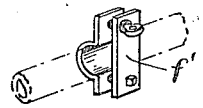
Figure 6:
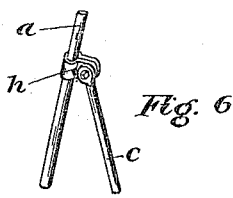
Figure 7:
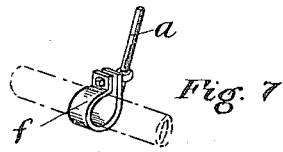
Figure 8:
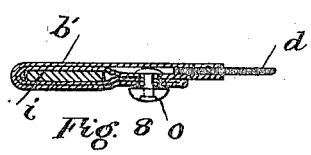
Figure 9:
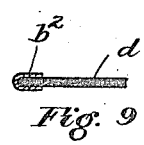

My invention may best be understood by reference to the accompanying drawing in which, Like letters indicate like parts in all the figures, Figure 1 is a perspective view of a motor cycle with my wind shield attached, Fig. 2 is a perspective detail showing parts of the frame, Fig. 3 is a detail showing the manner of securing the shield to the side rods in one form of the device, Fig. 4 is a perspective view of a modified form of the device, Fig. 5 is a detail of one of the clips, Fig. 6 shows the joint between the brace and the frame, Fig. 7 shows a modified form of clip, Fig. 8 is a section on the line 1—1 of Fig. 4 and, Fig. 9 is a horizontal section at the edge of the shield as shown in Fig. 4.

Referring to the form shown in Figs. 1, 2 and 3, the wind shield is made up of a frame composed of substantially vertical side rods $a$ secured directly to the handle bars by clips $f$ in such a manner that the rod may be adjusted vertically at the inside or outside of the handle bar. Braces $c$ connected to the side rods by flexible joints $h$ (shown in Fig. 6) and with the handle bars by clips $f$ are used to stiffen the frame and hold it firmly in place. Thus, the frame is capable of being adjusted vertically and set at any desired angle. The frame is provided with upper and lower cross frame members $i$ which extend from one of the vertical rods $a$ across to the opposite rod. The frame members $i$ are curved or arched in a forward direction so as to present a convex surface to the wind.

The shield proper is made up of a sheet of celluloid $d$ which is fastened in place in the frame by means of a binding $b$ overlapping the celluloid and secured in place by turn buttons $o$ such as are ordinarily used in such constructions.

In addition to the wind shield proper, I provide an apron $e$ which extends below the wind shield in a rearward and inclined position so that the air is thrown down onto the motor, tending to keep it cool. The apron is buttoned to the lower portion of the wind shield proper and fasteners $g$ connect it with the handle bars, to hold it in position.

In Figs. 4, 8 and 9, I have shown a modification of the device which has the advantage of simplicity and cheapness of construction over and above that shown in Fig. 1.

This modification shows the same construction of frame, that is, with the vertical side rods and curved cross rods but the celluloid is secured only at the cross bars of the frame leaving the sides free from the frame rods.

The top and bottom are fastened to the cross bars as shown at Fig. 8 by means of turn buttons $o$, binding $b'$ which extends around the core piece $i$ of the frame and the lateral edges are simply bound with narrow binding as shown at $b^2$ of Figs. 4 and 9. In Fig. 5, I have shown a modified form of clamp $f'$ in which two bolts are used in place of a single bolt but which is adapted to a greater variety of handle bars.

The form shown in Fig. 4 gives a narrow edge at the sides to obstruct the light and is an effective and simple form.

I claim:—

1. In a wind shield for motor cycles, the combination of a pair of upright frame rods, a brace secured to each rod, clips on the handle bars for holding the rods and braces and permitting their vertical adjustment, frame members uniting the upper and lower ends of said rods and curved toward the front, and a sheet of flexible transparent material uniting said frame members and free from connection with the upright frame rods.

2. In a wind shield for motor cycles, the combination of a pair of upright frame rods, a brace for each rod, curved cross-frame members uniting the upper and lower ends of said rods, clips for securing said rods and braces to the handle bars and permitting their vertical adjustment, said frame rods and curved rods constituting a supporting frame, and a strip of flexible transparent material for covering said supporting frame.

3. In a wind shield for motor cycles, the combination of an upright frame secured to the handle bars, said frame having upper and lower forwardly curved members and a piece of flexible transparent material stretched between said members and free at its lateral edges.

4. In a wind shield for motor cycles, the combination of an upright frame presenting a forward curve or arch in a horizontal plane, a strip of flexible transparent material covering said frame, clips for securing said frame between the handle bars and a deflecting apron extending below said frame and said handle bars, and positioned to direct a current of air onto the motor, to cool the same.

5. In a wind shield for motor cycles, the combination of an upright frame presenting a forward curve or arch in a horizontal plane, a strip of flexible transparent material covering said frame, clips for securing said frame to the handle bars, a deflecting apron secured to the lower end of said frame and extending below said handle bars and fastening devices for securing said apron to said handle bars, and positioned to direct a current of air onto the motor, to cool the same.

In testimony whereof I hereby affix my signature.

HARRY T. JOSE.

Copies of this patent may be obtained for five cents each, by addressing the "Commissioner of Patents, Washington, D. C."